US011899883B2

(12) United States Patent
Fujisawa et al.

(10) Patent No.: US 11,899,883 B2
(45) Date of Patent: Feb. 13, 2024

(54) DISPLAY DEVICE AND WATCH

(71) Applicant: Japan Display Inc., Tokyo (JP)

(72) Inventors: Akihiko Fujisawa, Tokyo (JP); Kaoru Ito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/947,559

(22) Filed: Sep. 19, 2022

(65) Prior Publication Data

US 2023/0017345 A1 Jan. 19, 2023

Related U.S. Application Data

(63) Continuation of application No. PCT/JP2021/010188, filed on Mar. 12, 2021.

(30) Foreign Application Priority Data

Mar. 19, 2020 (JP) .................. 2020-049083

(51) Int. Cl.
*G06F 3/041* (2006.01)
*G06F 3/044* (2006.01)
*G02F 1/1333* (2006.01)
*G02F 1/1343* (2006.01)
(Continued)

(52) U.S. Cl.
CPC ........ *G06F 3/0418* (2013.01); *G02F 1/13338* (2013.01); *G02F 1/134309* (2013.01);
(Continued)

(58) Field of Classification Search
CPC .......... G02F 1/13338; G02F 1/134309; G04G 21/08; G04G 17/045; G04G 17/04;
(Continued)

(56) References Cited

U.S. PATENT DOCUMENTS

2009/0046077 A1 2/2009 Tanaka et al.
2010/0013791 A1 1/2010 Haga et al.
(Continued)

FOREIGN PATENT DOCUMENTS

JP 2009-244958 A 10/2009
JP 2011-014109 A 1/2011
(Continued)

OTHER PUBLICATIONS

International Search Report issued in International Patent Application No. PCT/JP2020/010188 dated Jun. 1, 2021 and English translation of same. 5 pages.

(Continued)

*Primary Examiner* — Hong Zhou
(74) *Attorney, Agent, or Firm* — K&L Gates LLP

(57) ABSTRACT

According to one embodiment, a display device includes a display area, a plurality of sensor electrodes and a shield electrode. The display panel includes a first substrate, a second substrate opposed to the first substrate, a liquid crystal layer sealed between the first substrate and the second substrate, a pixel electrode, and a counter-electrode. The plurality of sensor electrodes are arranged to surround the display area. The shield electrode is arranged between the plurality of sensor electrodes and the pixel electrode or the counter-electrode located closest to a boundary between the display area and a non-display area surrounding the display area, in planar view. A predetermined reference voltage is applied to the shield electrode.

19 Claims, 14 Drawing Sheets

(51) Int. Cl.
*G04G 17/04* (2006.01)
*G04G 21/08* (2010.01)

(52) U.S. Cl.
CPC .............. *G04G 17/04* (2013.01); *G04G 21/08* (2013.01); *G06F 3/044* (2013.01); *G06F 3/0412* (2013.01); *G06F 3/04166* (2019.05); *G06F 2203/04107* (2013.01)

(58) Field of Classification Search
CPC .......... G06F 2203/04107; G06F 3/041; G06F 3/0412; G06F 3/04166; G06F 3/0418; G06F 3/044
See application file for complete search history.

(56) References Cited

U.S. PATENT DOCUMENTS

| | | |
|---|---|---|
| 2010/0182273 A1 | 7/2010 | Noguchi et al. |
| 2011/0193818 A1* | 8/2011 | Chen ..................... G06F 3/041 345/173 |
| 2015/0084888 A1* | 3/2015 | Han ..................... G06F 3/0412 345/173 |
| 2017/0205912 A1* | 7/2017 | Li ..................... G06F 3/0412 |
| 2019/0095008 A1 | 3/2019 | Murata et al. |
| 2019/0286281 A1* | 9/2019 | Aoki ..................... G06F 3/044 |
| 2021/0165526 A1* | 6/2021 | Fan ..................... G06F 3/044 |

FOREIGN PATENT DOCUMENTS

| | | |
|---|---|---|
| JP | 2019-061563 A | 4/2019 |
| WO | WO2007/102238 A1 | 9/2007 |

OTHER PUBLICATIONS

Written Opinion issued in International Patent Application No. PCT/JP2021/010188 dated Jun. 1, 2021. 4 pages.

* cited by examiner

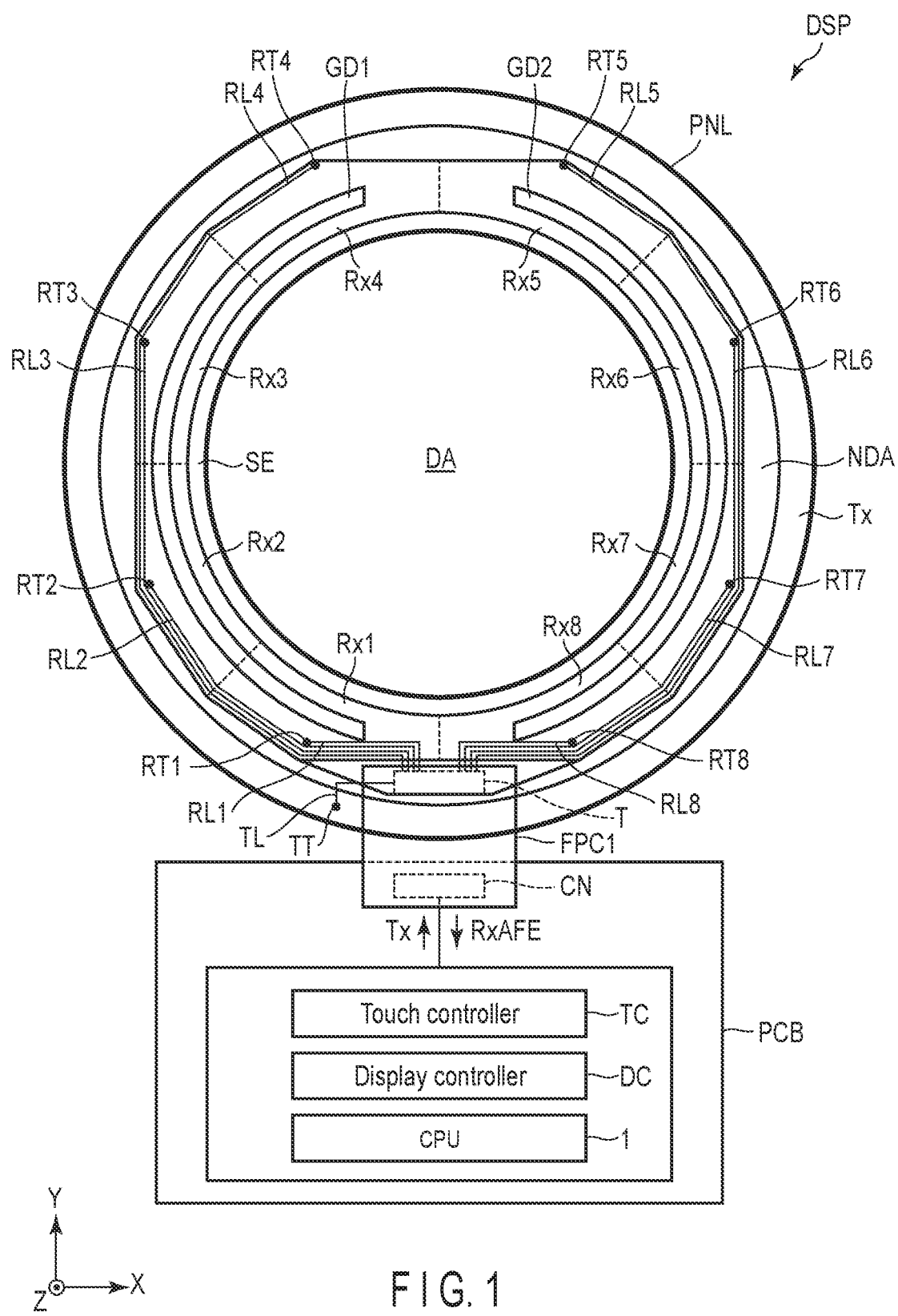
F I G. 1

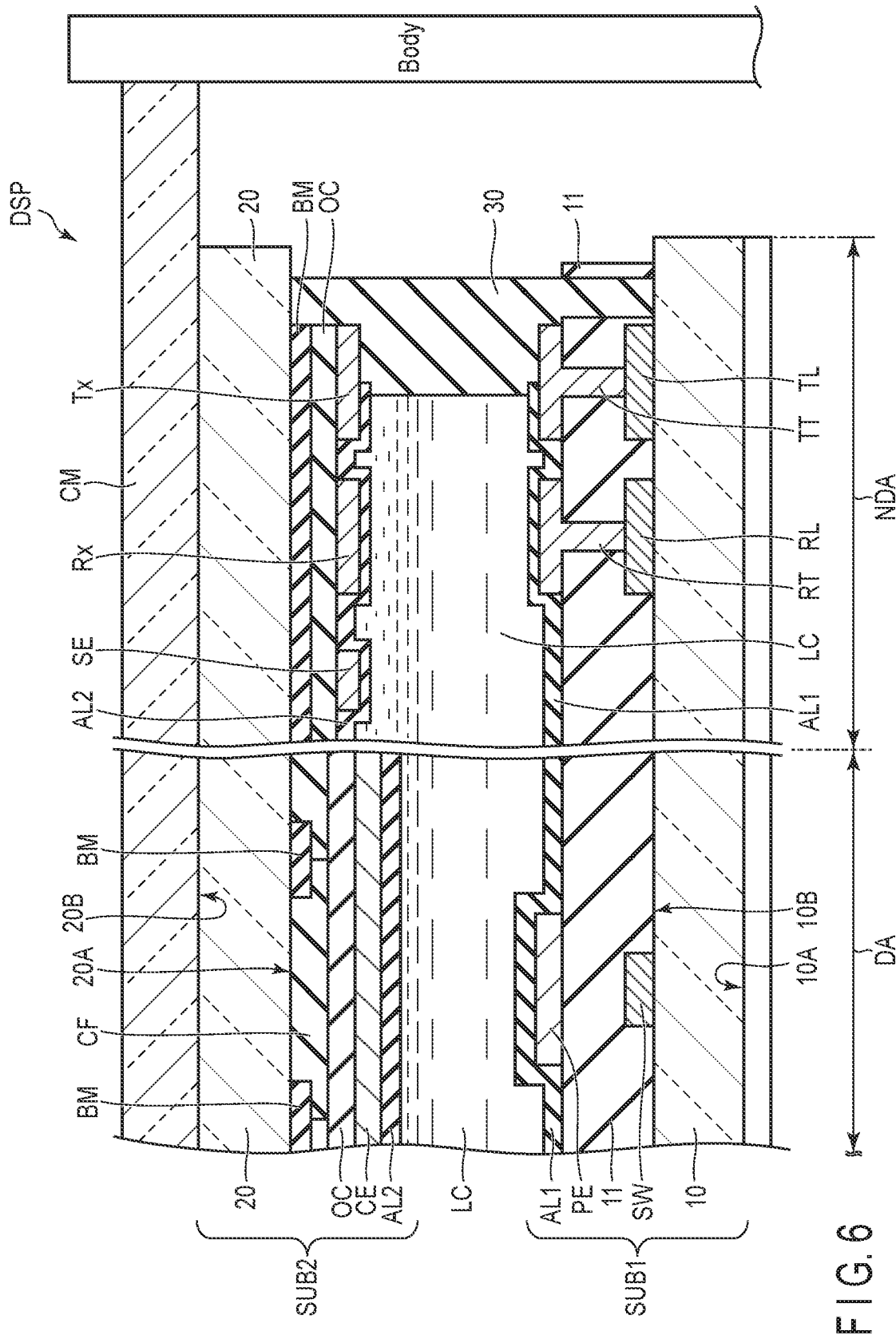
F I G. 6

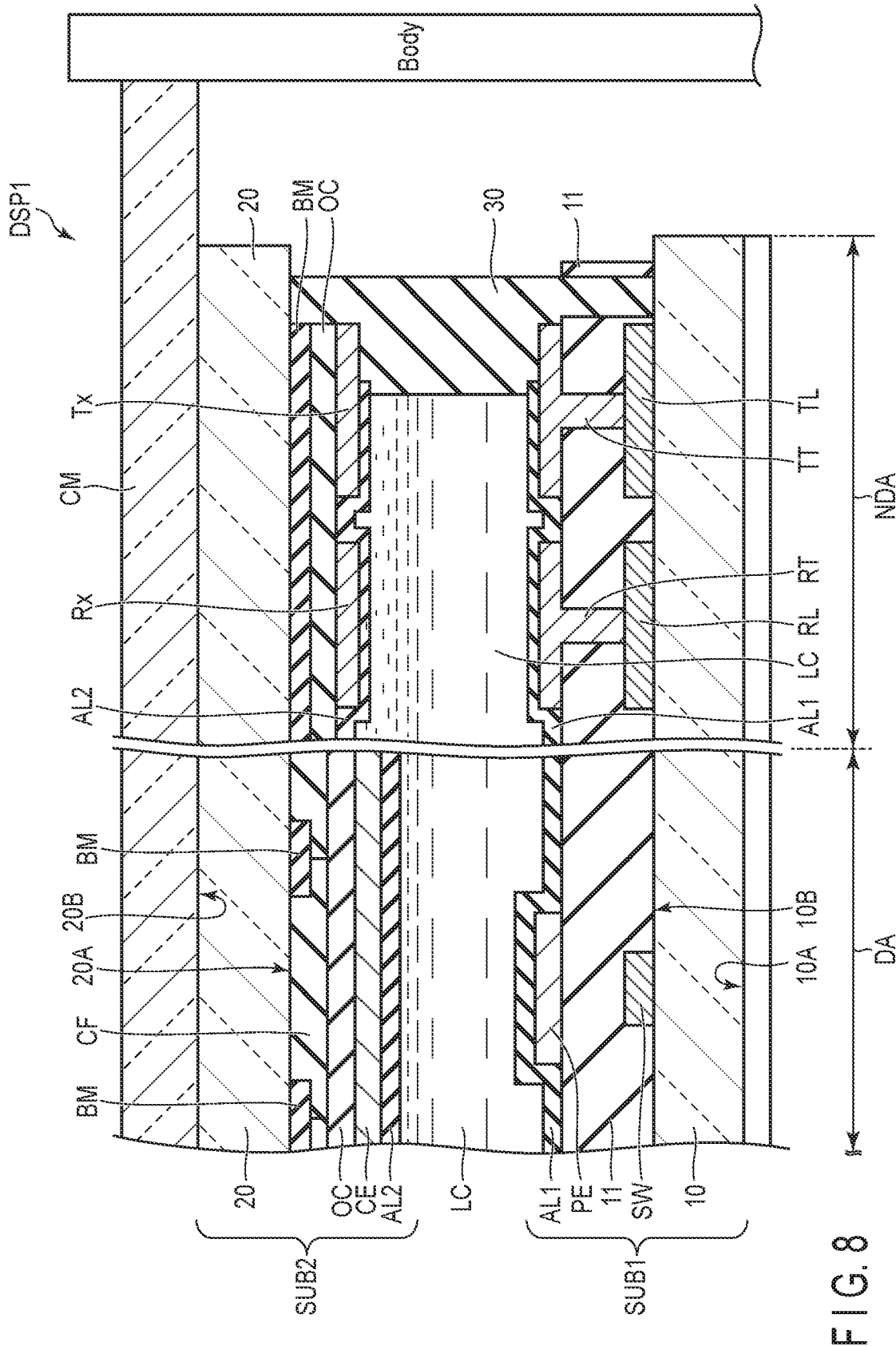
F I G. 8

DISPLAY DEVICE AND WATCH

CROSS-REFERENCE TO RELATED APPLICATIONS

This application is a Continuation Application of PCT Application No. PCT/JP2021/010188, filed Mar. 12, 2021, and based upon and claiming the benefit of priority from Japanese Patent Application No. 2020-049083, filed Mar. 19, 2020, the entire contents of all of which are incorporated herein by reference.

FIELD

Embodiments described herein relate generally to a display device and a watch.

BACKGROUND

In recent years, wearable devices with a touch detection function (for example, wristwatch-type wearable devices, eyeglass-type wearable devices, and the like) have gradually been widespread. Such wearable devices are required to have both display quality when displaying an image and excellent operability by touch, and various developments are underway.

BRIEF DESCRIPTION OF THE DRAWINGS

FIG. 1 is a plan view showing a configuration example of a display device according to embodiments.

FIG. 6 is a cross-sectional view showing a configuration example of the display device according to the embodiments.

FIG. 8 is a cross-sectional view showing a configuration example of the display device according to a comparative example.

DETAILED DESCRIPTION

Figure 2:
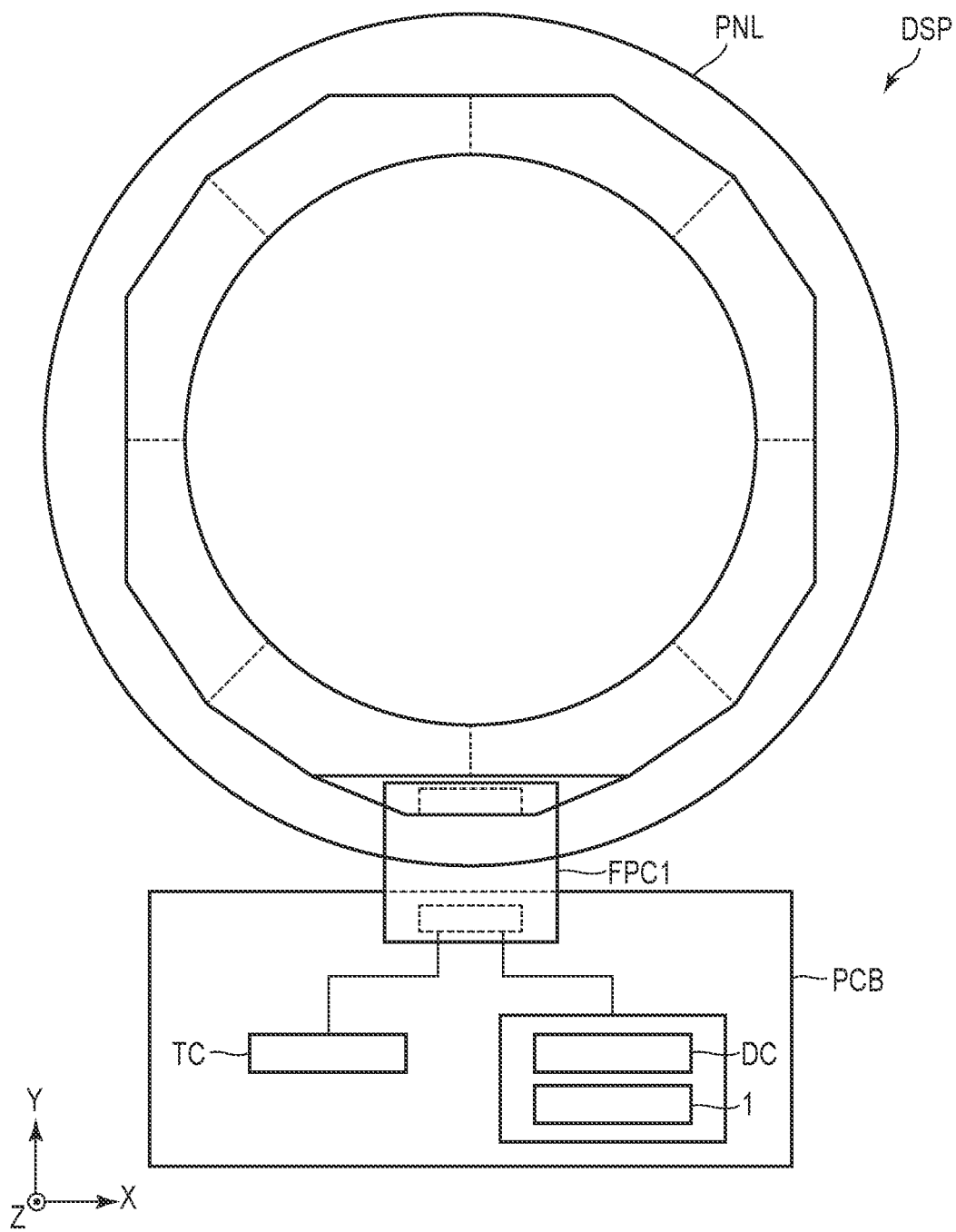
FIG. 2 is a view showing an example of a mounting mode of a touch controller, a display controller, and a CPU.

In general, according to one embodiment, a display device includes a display area, a plurality of sensor electrodes and a shield electrode. The display panel includes a first substrate, a second substrate opposed to the first substrate, a liquid crystal layer sealed between the first substrate and the second substrate, a pixel electrode, and a counter-electrode. The plurality of sensor electrodes are arranged to surround the display area. The shield electrode is arranged between the plurality of sensor electrodes and the pixel electrode or the counter-electrode located closest to a boundary between the display area and a non-display area surrounding the display area, in planar view. A predetermined reference voltage is applied to the shield electrode.

According to another embodiment, a display device includes a display area and a plurality of sensor electrodes. The display panel includes a first substrate, a second substrate opposed to the first substrate, a liquid crystal layer sealed between the first substrate and the second substrate, a pixel electrode, and a counter-electrode. The plurality of sensor electrodes are arranged to surround the display area. The display device has a space with a width in a range of 10 µm to 400 µm between the plurality of sensor electrodes and the pixel electrode or the counter-electrode which is located closest to a boundary between the display area and a non-display area surrounding the display area, in planar view.

According to yet another embodiment, a watch includes the above display device.

Various embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings are illustrated schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the embodiments, a display device with a touch detection function will be described as an example of the display device. There are various types of the touch detection method such as an optical type, a resistance type, a capacitive type, and an electromagnetic induction type. The capacitive type, of the various detection types described above, is a detection type utilizing the change in capacitance due to approach or contact of an object (for example, a finger), and has advantages that the detection can be implemented with a relatively simple structure, power consumption is low, and the like. In the embodiments, a display device with a touch detection function using a capacitive scheme will be mainly described.

It is assumed that the capacitive scheme includes a mutual capacitive scheme of generating an electric field using a pair of a transmitting electrode (drive electrode) and a receiving electrode (detecting electrode) arranged in a state of being separated from each other and detecting the change in the electric field due to approach or contact of an object, and a self-capacitive scheme of detecting the change in the capacitance due to approach or contact of an object using a single electrode.

FIG. 1 is a plan view showing a configuration example of a display device DSP of the embodiments. The configuration on the touch detection function is mainly shown in FIG. 1. For example, a first direction X, a second direction Y, and a third direction Z are orthogonal to each other but may intersect at an angle other than ninety degrees. The first direction X and the second direction Y correspond to the directions parallel to a main surface of a substrate constituting the display device DSP, and the third direction Z corresponds to a thickness direction of the display device DSP. In the specification, a direction toward a tip of an arrow indicating the third direction Z is referred to as an upper direction, and a direction toward the opposite side from the tip of the arrow is referred to as a lower direction. In addition, an observation position at which the display device DSP is observed is assumed to be located on the tip side of the arrow indicating the third direction Z, and viewing from the observation position toward an X-Y plane defined by the first direction X and the second direction Y is referred to as planar view.

As shown in FIG. 1, the display device DSP comprises a display panel PNL, a flexible wiring board FPC1, and a circuit board PCB. The display panel PNL and the circuit board PCB are electrically connected via the flexible wiring board FPC1. More specifically, a terminal portion T of the display panel PNL and a connection portion CN of the circuit board PCB are electrically connected via the flexible wiring board FPC1.

The display panel PNL comprises a display area DA for displaying an image and a frame-shaped non-display area NDA that surrounds the display area DA. In FIG. 1, an area of an inner circle of two concentric circles represented by thick lines corresponds to the display area DA, and an area obtained by excluding the inner circle from an outer circle corresponds to the non-display area NDA. In the embodiments, it is exemplified that the display area DA has a circular shape and the non-display area NDA surrounding the display area DA also has the shape of the same type, but the shapes are not limited to this and the display area DA may not have the circular shape and the non-display area NDA may have a shape of a different type from that of the display area DA. For example, the display area DA may have a rectangular shape. Furthermore, when the display area DA has a rectangular shape, the non-display area NDA may have a circular shape which is the shape of a type different from that of the display area DA.

As shown in FIG. 1, a plurality of detection electrodes Rx1 to Rx8 (sensor electrodes) are arranged so as to surround the display area DA, in the non-display area NDA. In the embodiments, eight detection electrodes Rx1 to Rx8 are shown, but the number of detection electrodes Rx arranged in the non-display area NDA is not limited to this, and any number of detection electrodes Rx may be arranged so as to surround the display area DA. The plurality of detection electrodes Rx1 to Rx8 are electrically connected to Rx terminal portions RT1 to RT8 via a conductive material (conductive beads) (not shown). In addition, Rx wiring lines RL1 to RL8 extending from the Rx terminal portions RT1 to RT8 are electrically connected to the terminal portion T arranged in the non-display area NDA. In the embodiments, it is exemplified that the Rx wiring lines RL1 to RL8 extend along the outer circumference of the detection electrodes Rx1 to Rx8, but the extending shapes of the detection wiring lines RL1 to RL8 may be other shapes. All the detection wiring lines RL1 to RL8 are wiring lines for outputting detection signals (RxAFE signals) from the detection electrodes Rx1 to Rx8.

As shown in FIG. 1, a ring-shaped drive electrode Tx is arranged so as to surround the detection electrodes Rx1 to Rx8 in the non-display area NDA. In the embodiments, one ring-shaped drive electrode Tx is exemplified, but the number of drive electrodes Tx arranged in the non-display area NDA is not limited to this, and a plurality of drive electrodes Tx may be arranged so as to surround the detection electrodes Rx1 to Rx8. In this case, the plurality of drive electrodes Tx are electrically connected to each other via wiring lines (not shown). The drive electrode Tx is electrically connected to a Tx terminal portion TT via a conductive material (conductive beads) (not shown). A Tx wiring line TL extending from the Tx terminal portion TT is electrically connected to the terminal portion T arranged in the non-display area NDA. The Tx wiring line TL is a wiring line for outputting a drive signal (Tx signal or a drive pulse) to the drive electrode Tx.

As shown in FIG. 1, a shield electrode SE is arranged at the non-display area NDA so as to surround the display area DA. More specifically, the shield electrode SE is arranged to be located between the display area DA and the plurality of detection electrodes Rx1 to Rx8 in planar view. According to another expression, the shield electrode SE is arranged to surround the display area DA and to be surrounded by the plurality of detection electrodes Rx1 to Rx8. In the embodiments, one shield electrode SE is exemplified, but the number of shield electrodes SE arranged at the non-display area NDA is not limited to this, and a plurality of shield electrodes SE may be arranged to be located between the display area DA and the plurality of detection electrodes Rx1 to Rx8 in planar view. In this case, the plurality of shield electrodes SE are electrically connected to each other via wiring lines (not shown). The shield electrode SE is electrically connected to a shield terminal portion (not shown) via a conductive material (conductive beads) (not shown). A GND voltage or a predetermined reference voltage is applied to the shield terminal portion.

As shown in FIG. 1, scanning line drive circuits GD1 and GD2 are arranged on the right and left sides of the non-display area NDA, and the scanning line drive circuits GD1 and GD2 and the detection electrodes Rx1 to Rx8 overlap in planar view. Since details of the scanning line drive circuits GD1 and GD2 are described later, their detailed description are omitted here.

As shown in FIG. 1, a touch controller TC, a display controller DC, a CPU 1, and the like are arranged on the circuit board PCB. The touch controller TC outputs a drive signal to the drive electrode Tx arranged on the display panel PNL, and receives input of the detection signals output from the detection electrodes Rx1 to Rx8 (i.e., detects approach or contact of an object). The touch controller TC may be implemented separately as a drive circuit that outputs a drive signal to the drive electrode Tx and a detection circuit that receives input of the detection signals output from the detection electrodes Rx1 to Rx8.

The display controller DC outputs a video signal indicating an image displayed on the display area DA of the display panel PNL and control signals for controlling the scanning line drive circuits GD1 and GD2.

The CPU 1 executes operations corresponding to output of synchronization signals that define the operation timing of the touch controller TC and the display controller DC, approach or contact of an object indicated by the detection signal whose input is received by the touch controller TC, and the like.

Figure 3:
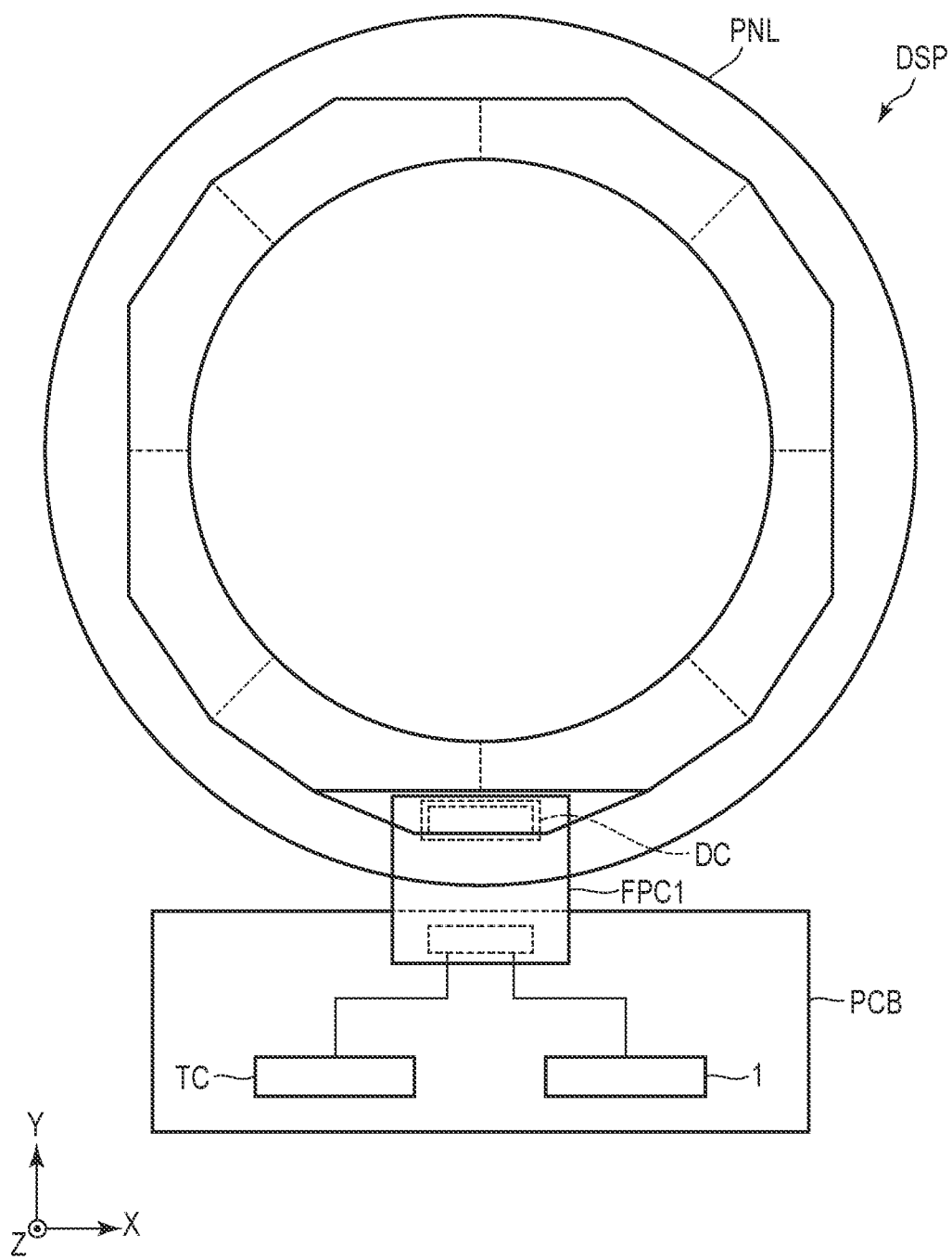
FIG. 3 is a view showing another example of the mounting mode of the touch controller, the display controller, and the CPU.
Figure 4:
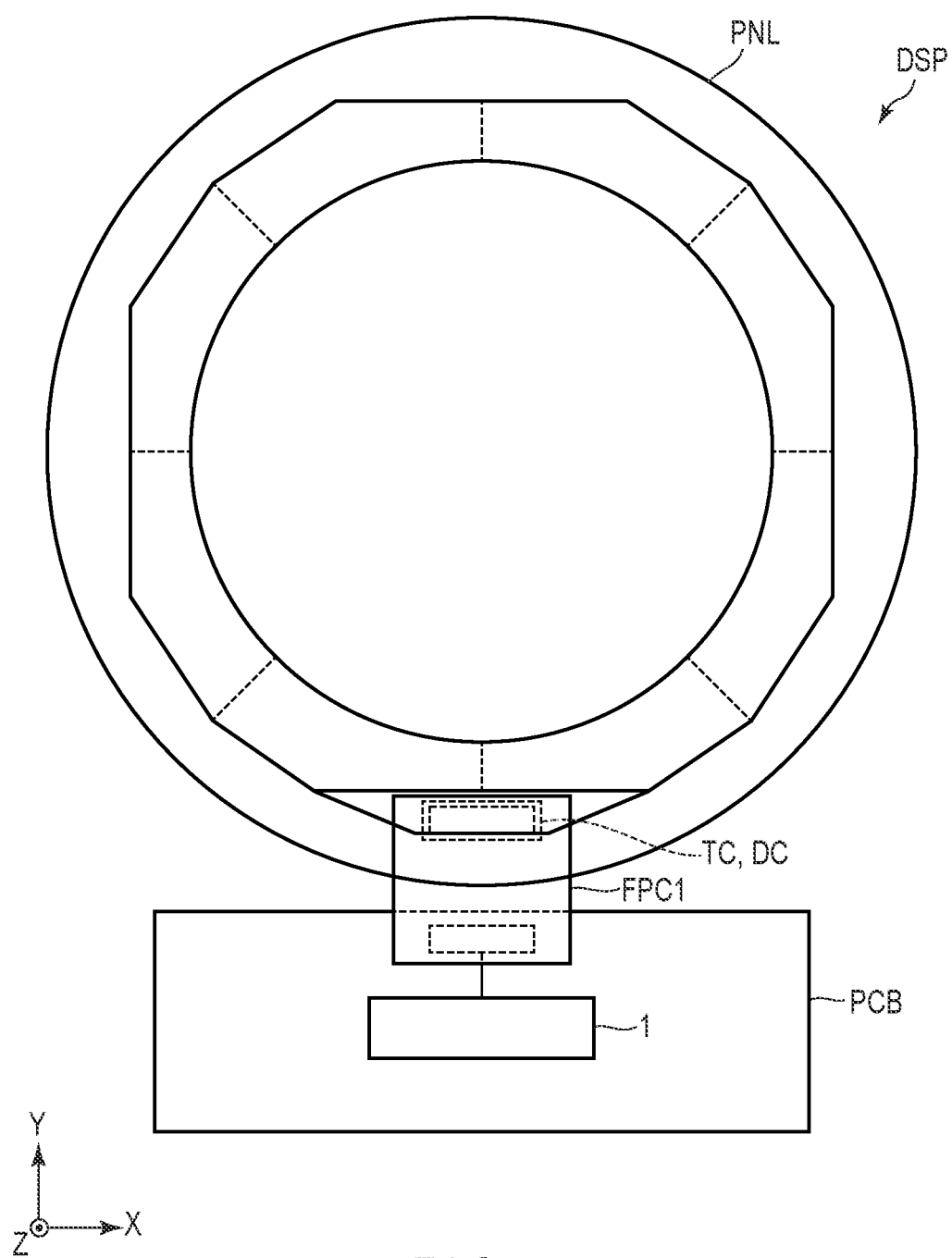
FIG. 4 is a view showing yet another example of the mounting mode of the touch controller, the display controller, and the CPU.

In FIG. 1, it is exemplified that the touch controller TC, the display controller DC, and the CPU 1 are implemented by one semiconductor chip, but their mounting form is not limited to this and, for example, each portion may be mounted on the circuit board PCB while separating the only touch controller TC as a different body as shown in FIG. 2, the touch controller TC and the CPU 1 may be separately mounted on the circuit board PCB and the display controller DC may be mounted on the display panel PNL by Chip On Glass (COG) as shown in FIG. 3, or only the CPU 1 may be mounted on the circuit board PCB and the touch controller TC and the display controller DC may be mounted on the display panel PNL by COG as shown in FIG. 4.

Figure 5:
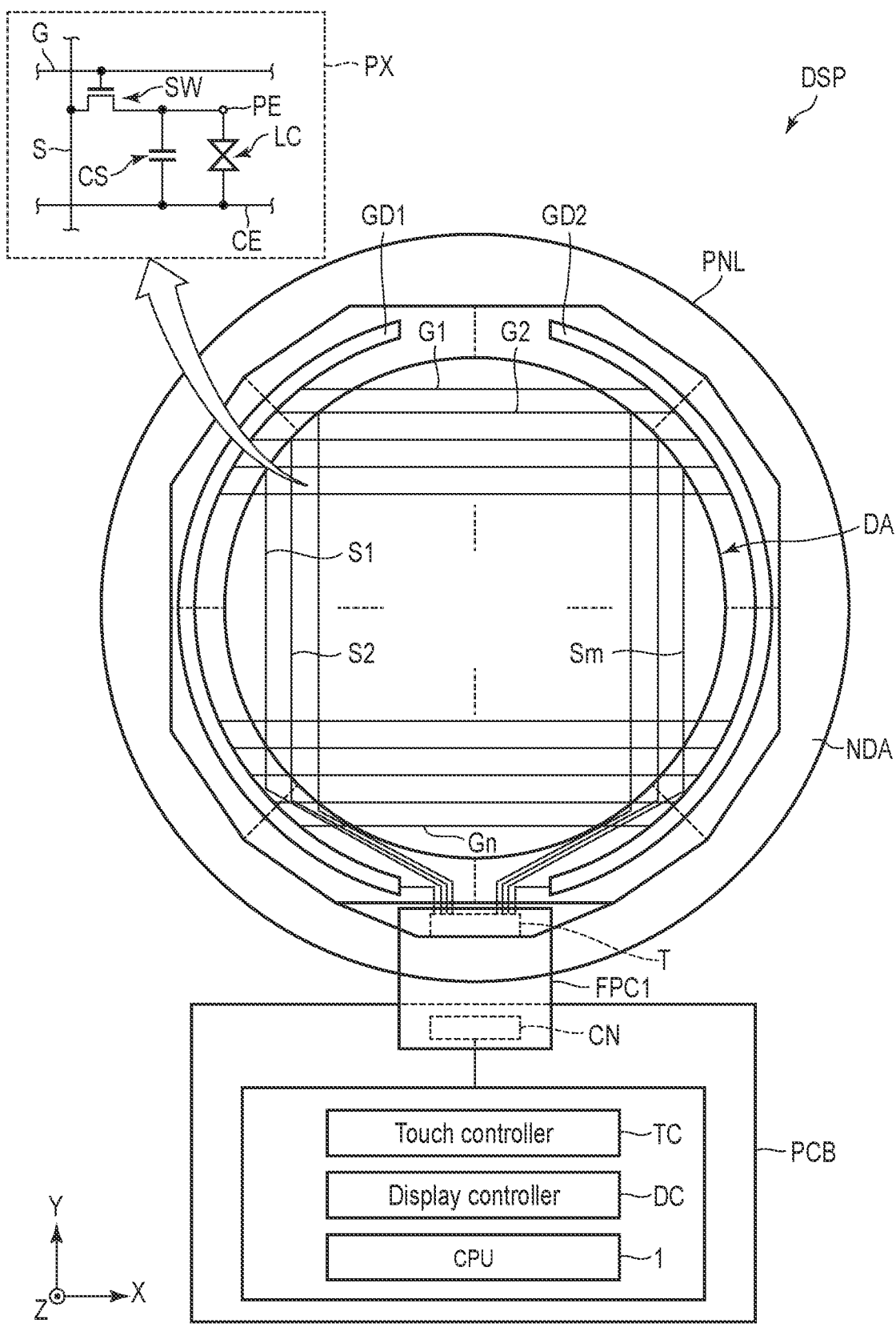
FIG. 5 is another plan view showing a configuration example of the display device according to the embodiments.

FIG. 5 is another plan view showing a configuration example of the display device DSP of the embodiments. The configuration on the image display function is mainly shown in FIG. 5. As shown in FIG. 5, the display panel PNL comprises n scanning lines G (G1 to Gn) and m signal lines S (S1 to Sm) in the display area DA. Both n and m are positive integers, and n may be equal to m or n may be different from m. The scanning lines G extend in the first direction X and are spaced apart and arranged in the second direction Y. The signal lines S extend in the second direction Y and are spaced apart and arranged in the first direction X. Pixels PX are arranged in an area partitioned by the scanning line G and the signal line S. In other words, the display panel PNL comprises a large number of pixels PX arrayed in a matrix in the first direction X and the second direction Y, in the display area DA.

As shown and enlarged in FIG. 5, each pixel PX comprises a switching element SW, a pixel electrode PE, a common electrode CE, a liquid crystal layer LC and the like. The switching element SW is constituted by, for example, a thin-film transistor (TFT) and is electrically connected to the scanning line G and the signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. Each of the pixel electrodes PE is opposed to the common electrode CE, and drives the liquid crystal layer LC by an electric field produced between the pixel electrode PE and the common electrode CE. A storage capacitance CS is formed between, for example, an electrode having the same electric potential as the common electrode CE and an electrode having the same electric potential as the pixel electrode PE.

At least one of ends of the scanning line G is electrically connected to at least one of the scanning line drive circuits GD1 and GD2. The scanning line drive circuits GD1 and GD2 are electrically connected to the terminal portion T, and a control signal from the display controller DC is input to the scanning line drive circuits GD1 and GD2. The scanning line drive circuits GD1 and GD2 output scanning signals for controlling the operation of writing the video signal to each pixel PX, to the scanning line G, in accordance with the input control signal. One of ends of the signal line S is electrically connected to the terminal portion T, and a video signal from the display controller DC is input to the signal line S.

FIG. 6 is a cross-sectional view showing a configuration example of the display device DSP. Each of the configuration on the display area DA side and the configuration on the non-display area NDA side will be described below.

The display panel PNL comprises a first substrate SUB1, a second substrate SUB2, a liquid crystal layer LC, a seal 30, a backlight device BL, and a cover member CM. The first substrate SUB1 and the second substrate SUB2 are formed in a flat plate shape parallel to the X-Y plane. The first substrate SUB1 and the second substrate SUB2 overlap with each other in planar view and are bonded by the seal 30. The liquid crystal layer LC is held between the first substrate SUB1 and the second substrate SUB2 and is sealed by the seal 30.

A backlight device BL is arranged on a back side of the first substrate SUB1 as an illumination device for illuminating the display panel PNL. Various types of backlight devices can be employed as the backlight device BL and, for example, backlight devices using a light-emitting diode (LED), a cold-cathode tube (CCFL) or the like as the light source can be used.

It is exemplified in FIG. 6 that the display device DSP is a transmissive display device in which the backlight device BL is arranged, but the display device DSP may be a reflective display device in which the backlight device BL is not arranged. In this case, instead of arranging the backlight device BL, for example, a reflective electrode is arranged on or under the pixel electrode PE to be described later. The reflective electrode reflects light incident from the second substrate SUB2 side and makes the light incident on the liquid crystal layer LC to illuminate the display panel PNL.

A cover member CM is arranged on the second substrate SUB2. As the cover member CM, for example, an insulating substrate such as a glass substrate or a plastic substrate can be used. Although not shown in FIG. 7, a light-shielding layer may be arranged between the second substrate SUB2 and the cover member CM on the non-display area NDA side.

On the display area DA side, as shown in FIG. 6, the first substrate SUB1 comprises a transparent substrate 10, a switching element SW, a planarization film 11, a pixel electrode PE, and an alignment film AL1. The first substrate SUB1 comprises the scanning line G, the signal line S, and the like shown in FIG. 5 in addition to the above-described configuration, but their illustration is omitted in FIG. 6.

The transparent substrate 10 comprises a main surface (lower surface) 10A and a main surface (upper surface) 10B on a side opposite to the main surface 10A. The switching element SW is arranged on the main surface 10B side. The planarization film 11 is composed of at least one or more insulating films and covers the switching element SW. The pixel electrode PE is arranged for each pixel PX on the planarization film 11. The alignment film AL1 covers the pixel electrodes PE.

The switching element SW is simplified in FIG. 6, but the switching element SW actually includes a semiconductor layer and various electrodes. In addition, although not shown in FIG. 6, the switching element SW and the pixel electrode PE are electrically connected to each other through an opening portion formed in the planarization film 11. Furthermore, as described above, the scanning line G and the signal line S that are not shown in FIG. 6 are arranged, for example, between the transparent substrate 10 and the planarization film 11.

On the display area DA side, as shown in FIG. 6, the second substrate SUB2 comprises a transparent substrate 20, a light-shielding film BM, a color filter CF, an overcoat layer OC, a common electrode (counter-substrate) CE, and an alignment film AL2.

The transparent substrate 20 comprises a main surface (lower surface) 20A and a main surface (upper surface) 20B on a side opposite to the main surface 20A. The main surface 20A of the transparent substrate 20 is opposed to the main surface 10B of the transparent substrate 10. The light-shielding film BM partitions each pixel PX. The color filter CF is opposed to the pixel electrode PE, and a part of the color filter CF overlaps with the light-shielding layer BM. The color filter CF includes a red color filter, a green color filter, a blue color filter, and the like. The overcoat layer OC covers the color filter CF. The common electrode CE is arranged across a plurality of pixels PX and is opposed to a plurality of pixel electrodes PE in the third direction Z. In addition, the common electrode CE covers the overcoat layer OC. The alignment film AL2 covers the common electrode CE.

The liquid crystal layer LC is arranged between the main surface 10B and the main surface 20A and is in contact with the alignment films AL1 and AL2.

The transparent substrates 10 and 20 are, for example, insulating substrates such as glass substrates or plastic substrates. The planarization film 11 includes, for example, a transparent insulating material such as silicon oxide, silicon nitride, silicon oxynitride or acrylic resin. For example, the planarization film 11 includes an inorganic insulating film and an organic insulating film. The pixel electrodes PE and the common electrode CE are transparent electrodes formed of, for example, a transparent conductive material such as indium tin oxide (ITO) or indium zinc oxide (IZO). The light-shielding layer BM is formed of, for example, an untransparent metal material such as molybdenum (Mo), aluminum (Al), tungsten (W), titanium (Ti), or silver (Ag). The alignment films AL1 and AL2 are horizontal alignment films having an alignment restriction force substantially parallel to the X-Y plane. The alignment restriction force can be imparted by a rubbing treatment or an optical alignment treatment.

On the non-display area NDA side, as shown in FIG. 6, the first substrate SUB1 comprises the transparent substrate 10, the Rx wiring line RL, the Tx wiring line TL, the planarization film 11, the Rx terminal portion RT, the Tx terminal portion TT, and the alignment film AL1. Although not shown in FIG. 6 to prevent the illustration from being complicated, a shield terminal portion electrically connected to the shield electrode SE and a shield wiring line electrically connected to the shield terminal portion are further arranged on the first substrate SUB1, on the non-display area NDA side. The shield wiring line may be arranged in the same layer as the Rx wiring line RL and the Tx wiring line TL or may be arranged in a layer different from the Rx wiring line RL and the Tx wiring line TL. The shield terminal portion may be arranged in the same layer as the Rx terminal portion RT and the Tx terminal portion TT or may be arranged in a layer different from the Rx terminal portion RT and the Tx terminal portion TT. Detailed description of the configuration already described on the display area DA side will be omitted below.

The Rx wiring line RL and the Tx wiring line TL are arranged on the transparent substrate 10. The Rx wiring line RL and the Tx wiring line TL are arranged in the same layer as the switching element SW on the display area DA side. The Rx wiring line RL and the Tx wiring line TL may be arranged in the same layer or may be arranged in layers different from each other. The Rx terminal portion RT and the Tx terminal portion TT are arranged on the planarization film 11. The Rx terminal portion RT and the Tx terminal portion TT are arranged in the same layer as the pixel electrode PE on the display area DA side, and are formed of the same transparent conductive material as the pixel electrode PE. The Rx wiring line RL and the Rx terminal portion RT are electrically connected to each other via an opening portion formed in the planarization film 11. Similarly, the Tx wiring line TL and the Tx terminal portion TT are electrically connected to each other via an opening portion formed in the planarization film 11. Although not shown in FIG. 6, the Rx wiring line RL and the Tx wiring line TL are electrically connected to connection terminals of the flexible wiring board FPC1.

Although not shown in FIG. 6, a terminal portion T is arranged on a portion of the main surface 10B of the transparent substrate 10, which is not opposed to the main surface 20A, and the terminal portion T is electrically connected to the flexible wiring board FPC1. The terminal portion T is formed by covering a metal material such as Al with ITO or the like from the viewpoint of preventing corrosion.

On the non-display area NDA side, as shown in FIG. 6, the second substrate SUB2 comprises the transparent substrate 20, the light-shielding film BM, the overcoat layer OC, the detection electrode Rx, the drive electrode Tx, the shield electrode SE, and the alignment film AL2. Detailed description of the configuration already described on the display area DA side will be omitted below.

On the non-display area NDA side, unlike the display area DA side, the light-shielding film BM is arranged over a substantially entire surface of the transparent substrate 20. The overcoat layer OC covers the light-shielding film BM.

The detection electrode Rx is arranged in an island shape on the overcoat layer OC side and is opposed to the Rx terminal portion RT in the third direction Z. The detection electrode Rx is arranged in the same layer as the common electrode CE on the display area DA side, and is formed of the same transparent conductive material as the common electrode CE.

The drive electrode Tx is arranged on the overcoat layer OC side and is opposed to the Tx terminal portion TT in the third direction Z. The drive electrode Tx is arranged adjacent to the detection electrode Rx with a predetermined interval. The drive electrode Tx is arranged farther from the display area DA than the adjacent detection electrode Rx. The drive electrode Tx is arranged in the same layer as the common electrode CE on the display area DA side, and is formed of the same transparent conductive material as the common electrode CE.

The shield electrode SE is arranged on the overcoat layer OC side. The shield electrode SE is arranged adjacent to the detection electrode Rx with a predetermined interval. The shield electrode SE is arranged more closely to the display area DA than to the adjacent detection electrode Rx. The shield electrode SE is arranged between the detection electrode Rx and the pixel electrode PE or common electrode CE which is located closest to a boundary between the display area DA and the non-display area NDA. The shield electrode SE is arranged in the same layer as the common electrode CE on the display area DA side, and is formed of the same transparent conductive material as the common electrode CE. A width of the shield electrode SE is set to, for example, any value in a range of 1 μm to 300 μm, and, more desirably, any value in a range of 10 μm to 100 μm.

The first substrate SUB1 and the second substrate SUB2 are bonded to each other by the seal 30. In the non-display area NDA, the Rx terminal portion RT of the first substrate SUB1 and the detection electrode Rx of the second substrate SUB2 are electrically connected to each other by the conductive material (conductive beads) in the seal 30, in a cross-section different from FIG. 6. In addition, in the non-display area NDA, the Tx terminal portion TT of the first substrate SUB1 and the drive electrode Tx of the second substrate SUB2 are electrically connected to each other by the conductive material (conductive beads) included in the seal 30, in a cross-section different from FIG. 6. Furthermore, in the non-display area NDA, the shield terminal portion (not shown) of the first substrate SUB1 and the shield electrode SE of the second substrate SUB2 are electrically connected to each other by the conductive material (conductive beads) included in the seal 30, in a cross-section different from FIG. 6. The conductive material which connects the detection electrode Rx to the Rx terminal portion RT, the conductive material which connected the drive electrode Tx to the Tx terminal portion TT, and the conductive material which connects the shield electrode SE to the shield terminal portion are arranged not to be in contact with each other.

On the non-display area NDA side, a cover member CM is arranged on the second substrate SUB2, similarly to the display area DA side. On the non-display area NDA side, the cover member CM is connected (bonded) to the main body (body) of the display device DSP.

FIG. 6 illustrates a case where the liquid crystal mode of the display panel PNL is the so-called vertical field mode, which is classified into two categories according to the direction of the electric field applied to change the orientation of the liquid crystal molecules contained in the liquid crystal layer LC. However, the present structure is also applicable to the case where the liquid crystal mode is the so-called horizontal field mode. The pixel electrode PE is arranged at the first substrate SUB1 and the common electrode CE is arranged at the second substrate SUB2 when the liquid crystal mode is vertical field mode, and the pixel electrode PE and the common electrode CE are arranged on the first substrate SUB1 when the liquid crystal mode is the horizontal field mode.

The above-described vertical field mode includes, for example, a Twisted Nematic (TN) mode, a Vertical Alignment (VA) mode, and the like. In addition, the above-described horizontal field mode includes, for example, an In-Plane Switching (IPS) mode, a Fringe Field Switching (FFS) mode which is one of the IPS modes, and the like.

Figure 7:
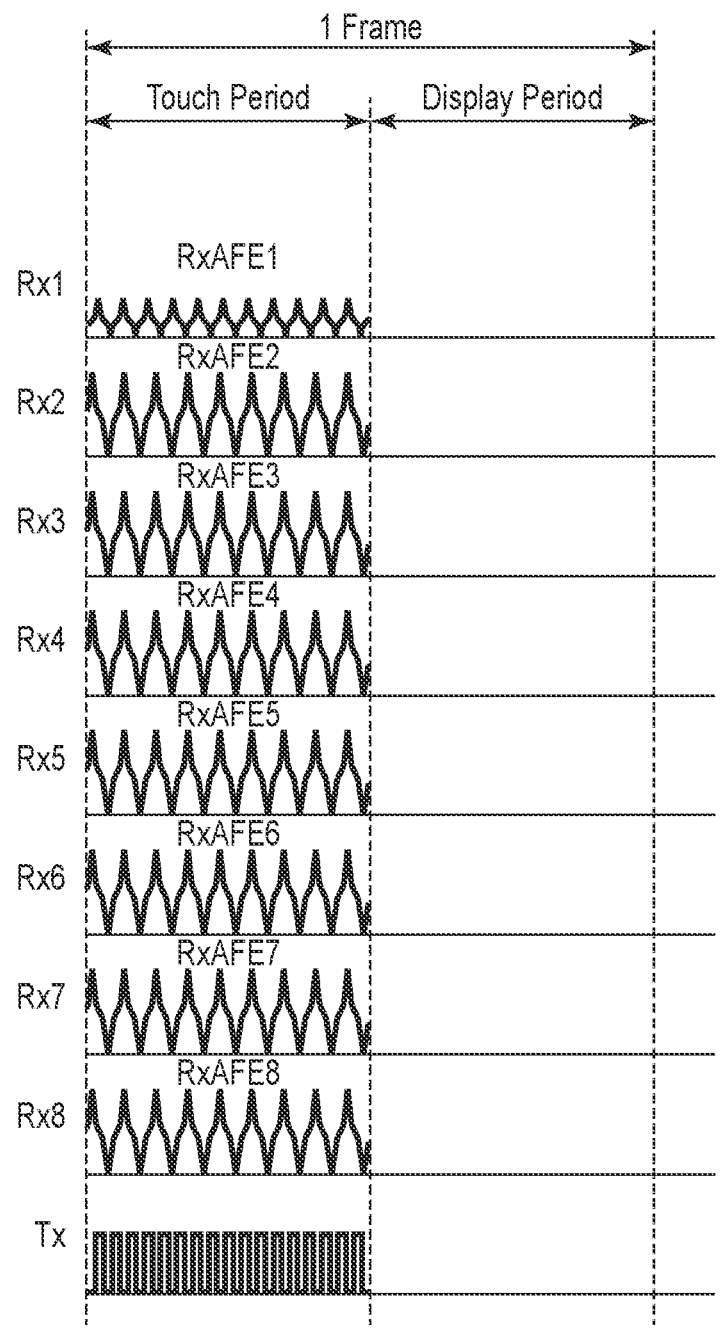
FIG. 7 is a chart showing a waveform of a detection signal read from the detection electrode using a mutual-capacitive scheme.

FIG. 7 is a chart showing waveforms of detection signals RxAFE1 to RxAFE8 read from the detection electrodes Rx1 to Rx8. It is assumed in FIG. 7 that a user's finger (in other words, a grounded conductor) is in touch with the detection electrode Rx1 portion arranged at the non-display area NDA.

In the embodiments, one frame period is composed of a touch detection period TP for detecting a touch and a display period DP for displaying an image. In the embodiments, when the touch detection period TP ends the period transitions to the display period DP, and when the display period DP ends, the touch detection period TP included in one next frame period is started. In the embodiments, it is assumed that one frame period is composed of one touch detection period TP and one display period DP, but the embodiments are not limited to this, and a plurality of touch detection periods TP and a plurality of display periods DP may be included in one frame period.

As shown in FIG. 7, when the touch detection period TP in a certain frame period is started, a drive signal is input (supplied) to the drive electrode Tx. When the drive signal is input to the drive electrode Tx, the detection signals RxAFE1 to RxAFE8 are read from the detection electrodes Rx1 to Rx8, and these detection signals RxAFE1 to RxAFE8 are output to the touch controller TC. Since it is assumed that the user's finger is in touch with the detection electrode Rx1 portion, the capacitance formed between the detection electrode Rx1 and the drive electrode Tx is reduced by the touched finger. For this reason, as shown in FIG. 7, the waveform of the detection signal RxAFE1 read from the detection electrode Rx1 with which the user's finger is in touch is detected with an amplitude smaller than the waveforms of the detection signals RxAFE2 to RxAFE8 read from the other detection electrodes Rx2 to Rx8. According to this, the touch controller TC detects the user's finger located on the detection electrode Rx1 corresponding to the detection signal RxAFE1 having an amplitude smaller than that of the other detection signals RxAFE2 to RxAFE8.

By obtaining the detection signals read from all the detection electrodes Rx and comparing their waveforms, the touch controller TC may find the detection signal having an amplitude smaller than the others and detect the user's finger on the detection electrode Rx corresponding to the detection signal having an amplitude smaller than the others (in other words, the touch controller may detect approach or contact of the object (conductor)). Alternatively, the touch controller TC may store the waveform of the detection signal read from the detection electrode Rx which is not touched, in a memory (not shown) or the like in advance, and, when the waveform of the detection signal read from the detection electrode Rx has an amplitude smaller than the waveform of the detection signal stored in the memory in advance, may detect the user's finger located on the detection electrode Rx corresponding to the detection signal. Alternatively, the touch controller TC can identify the waveform of the detection signal read from the detection electrode Rx which is not touched and the waveform of the detection signal read from the detection electrode Rx which is touched, by setting a threshold value of the detection circuit to a predetermined level. In other words, when the amplitude of the waveform of the detection signal is lower than or equal to the above-described predetermined bevel, the touch controller TC may detect the user's finger located on the detection electrode Rx corresponding to the detection signal. In addition, the touch controller TC can also detect a state in which the user's finger is in touch with an interval between two detection electrodes by setting a plurality of threshold values of the detection circuit. For example, when the user's finger is located between two detection electrodes, the amplitude of the detection signal is larger than that when the user's finger is on only one detection electrode, and is smaller than the amplitude of the detection signal output from the detection electrode Rx which is not touched. For this reason, the amplitudes of the plurality of detection waveforms can be detected and a state in which the user's finger is located between the two detection electrodes can also be detected by setting a plurality of threshold values of the detection circuit.

The advantages of the display device DSP according to the embodiments (in other words, the advantages of the display panel PNL on which the shield electrode SE is arranged as shown in FIG. 6) will be described with reference to a comparative example. The comparative example aims to describe a part of the advantages that can be achieved by the display device DSP according to the embodiments, and does not exclude the advantages common to the comparative example and the embodiments from the scope of invention.

A display device DSP1 of the comparative example is different from the configuration of the embodiments shown in FIG. 6 in that the shield electrode SE is not arranged as shown in FIG. 8.

In general, when images are displayed on the display area DA during the above display period DP, an electric field is formed between the pixel electrode PE and the common electrode CE provided at the display area DA. Liquid crystal molecules (not shown) contained in the liquid crystal layer LC are thereby affected by the electric field formed between the pixel electrode PE and the common electrode CE such that their aligned state changes from the initial alignment state. According to this, images corresponding to the video signals written to the pixels PX is displayed. An electric charge based on the electric field formed between the pixel electrode PE and the common electrode CE is stored until a next display period DP as the storage capacitance CS shown in FIG. 5.

In contrast, when approach or contact of an object is detected during the above touch detection period TP, the drive signal is input to the drive electrode Tx provided at the non-display area NDA. When the drive signal is input to the drive electrode Tx, an electric field is formed between the drive electrode Tx and the detection electrode Rx. When an object approaches or contacts the detection electrode Rx in this state, the capacitance based on the electric field formed between the drive electrode Tx and the detection electrode Rx is changed such that the approach or contact of the object is detected, as described with reference to FIG. 7.

In the comparative example shown in FIG. 8, the shield electrode SE is not arranged, and the detection electrode Rx is arranged near the display area DA. According to this, the storage capacitance CS based on the electric field formed between the pixel electrode PE and the common electrode CE during the display period DP, PE-Rx capacitance CP based on the electric field formed between the pixel electrode PE and the detection electrode Rx, and CE-Rx capacitance CC based on the electric field formed between the common electrode CE and the detection electrode Rx, are likely to affect the electric field formed between the drive electrode Tx and the detection electrode Rx during the touch detection period TP. In addition, when the aligned state of the liquid crystal molecules is changed during the display period DP, liquid crystal capacitance CLC is changed, and the liquid crystal capacitance CLC is likely to affect the electric field formed between the drive electrode Tx and the detection electrode Rx during the touch detection period TP. When the electric field formed between the drive electrode Tx and the detection electrode Rx is affected by the capacitance CS, the capacitance CP, the capacitance CC, and the capacitance CLC, the capacitance based on the electric field is likely to change. According to this, since the waveform of the detection signal read from the detection electrode Rx changes, the touch controller TC is likely to make a detection error (in other words, the touch detection accuracy is likely to be degraded) when an object is located at the detection electrode Rx portion.

In contrast, according to the configuration of the embodiments, as shown in FIG. 6, since the shield electrode SE is arranged between the detection electrode Rx and the pixel electrode PE or common electrode CE which is located closest to a boundary between the display area DA and the non-display area NDA, influences of the capacitance CS based on the electric field formed between the pixel electrode PE and the common electrode CE during the display period DP, the capacitance CP based on the electric field formed between the pixel electrode PE and the detection electrode Rx, the capacitance CC based on the electric field formed between the common electrode CE and the detection electrode Rx, and the capacitance CLC which changes in accordance with the change in the aligned state of the liquid crystal molecules, can be shielded by the shield electrode SE. In other words, the shield electrode SE shields the electric field formed between the drive electrode Tx and the detection electrode Rx against the influences of the capacitance CS, the capacitance CP, the capacitance CC, and the capacitance CLC during the touch detection period TP. According to this, since the capacitance based on the electric field formed between the drive electrode Tx and the detection electrode Rx is not changed due to the capacitance CS, the capacitance CP, the capacitance CC, and the capacitance CLC, occurrence of the above-described detection error can be suppressed (in other words, degradation in the touch detection accuracy can be suppressed).

In addition, in the comparative example shown in FIG. 8, since the detection electrode Rx is arranged near the display area DA, the electric field formed between the drive electrode Tx and the detection electrode Rx during the touch detection period TP is likely to affect the aligned state of the liquid crystal molecules contained in the liquid crystal layer LC on the display area DA side. According to this, the display quality is likely to be degraded.

In contrast, according to the configuration of the embodiments, since the detection electrode Rx is arranged separately from the display area DA by arranging the shield electrode SE between the detection electrode Rx and the pixel electrode PE or common electrode CE which is located more closely to the boundary between the display area DA and the non-display area NDA, as described above, the electric field formed between the drive electrode Tx and the detection electrode Rx during the touch detection period TP does not affect the liquid crystal molecules contained in the liquid crystal layer LC on the display area DA side. According to this, since the aligned state of the liquid crystal molecules contained in the liquid crystal layer LC on the display area DA side is not changed due to the electric field formed between the drive electrode Tx and the detection electrode Rx, the above-described degradation in display quality can be suppressed.

As described above, the shield electrode SE is arranged between the detection electrode Rx and the pixel electrode PE or common electrode CE which is located closest to the boundary between the display area DA and the non-display area NDA, in the display device DSP of the embodiments. According to this, since the electric field formed between the drive electrode Tx and the detection electrode Rx during the touch detection period TP is shielded against the influences of the capacitance CS based on the electric field formed between the pixel electrode PE and the common electrode CE during the display period DP, the capacitance CP based on the electric field formed between the pixel electrode PE and the detection electrode Rx, the capacitance CC based on the electric field formed between the common electrode CE and the detection electrode Rx, and the capacitance CLC which changes in accordance with the change in the aligned state of the liquid crystal molecules, a detection error of the object resulting from these capacitances can be suppressed. In other words, accuracy of detection of the approaching or contacting object can be improved.

It has been described above that the object detection error resulting from the storage capacitance CS, the PE-Rx capacitance CP, the CE-Rx capacitance CC, and the liquid crystal capacitance CLC is suppressed by arranging the shield electrode SE between the detection electrode Rx and the pixel electrode PE or the common electrode CE which is located closest to the boundary between the display area DA and the non-display area NDA. Another configuration capable of suppressing the object detection error resulting from the storage capacitance CS, the PE-Rx capacitance CP, the CE-Rx capacitance CC, and the liquid crystal capacitance CLC will be described below.

Figure 9:
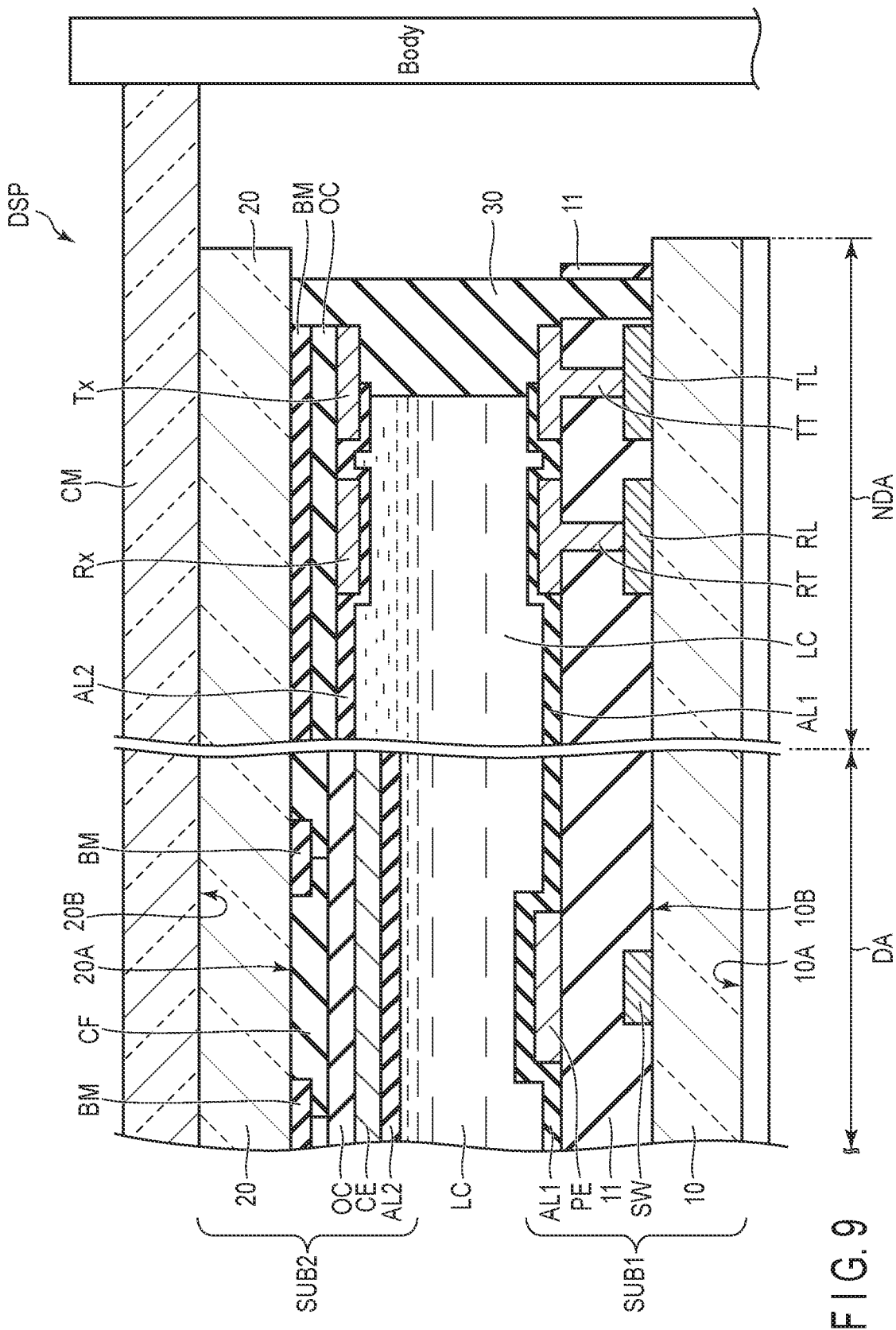
FIG. 9 is a cross-sectional view showing another configuration example of the display device according to the embodiments.

FIG. 9 is a cross-sectional view showing a configuration example of the display device DSP of the embodiments, which is different from that of FIG. 6. The configuration shown in FIG. 9 is different from the configuration shown in FIG. 6 in that the shield electrode SE is not arranged. However, the configuration shown in FIG. 9 is also different from the configuration of the comparative example shown in FIG. 8 in that a space having a predetermined distance is provided between the detection electrode Rx and the pixel electrode PE or common electrode CE which is located closest to the boundary between the display area DA and the non-display area NDA.

The distance of the space (space width) provided between the detection electrode Rx and the display area DA is set to, for example, any value in a range of 10 μm to 400 μm and, more desirably, any value in a range of 50 μm to 200 μm.

In the configuration shown in FIG. 9, a space having a predetermined space width is provided between the detection electrode Rx and the pixel electrode PE or common electrode CE which is located closest to the boundary between the display area DA and the non-display area NDA, and the detection electrode Rx is arranged sufficiently far from the pixel electrode PE or common electrode CE and the liquid crystal layer LC (display area DA). For this reason, the influences of the capacitance CS based on the electric field formed between the pixel electrode PE and the common electrode CE during the display period DP, the capacitance CP based on the electric field formed between the pixel electrode PE and the detection electrode Rx, the capacitance CC based on the electric field formed between the common electrode CE and the detection electrode Rx, and the capacitance CLC which changes in accordance with the change in the aligned state of the liquid crystal molecules, on the electric field formed between the drive electrode Tx and the detection electrode Rx during the touch detection period TP is suppressed. According to this, the capacitance based on the electric field formed between the drive electrode Tx and the detection electrode Rx is not changed due to these capacitances. For this reason, in the configuration shown in FIG. 9, too, the above-described occurrence of detection error can be suppressed.

In addition, in the configuration shown in FIG. 9, since the detection electrode Rx is arranged sufficiently far from the display area DA by providing the space having the predetermined space width, the electric field formed between the drive electrode Tx and the detection electrode Rx during the touch detection period TP does not affect the liquid crystal molecules contained in the liquid crystal layer LC on the display area DA side. According to this, the aligned state of the liquid crystal molecules contained in the liquid crystal layer LC on the display area DA side is not changed due to the electric field formed between the drive electrode Tx and the detection electrode Rx. For this reason, in the configuration shown in FIG. 9, too, the above-described degradation in display quality can be suppressed.

Figure 10:
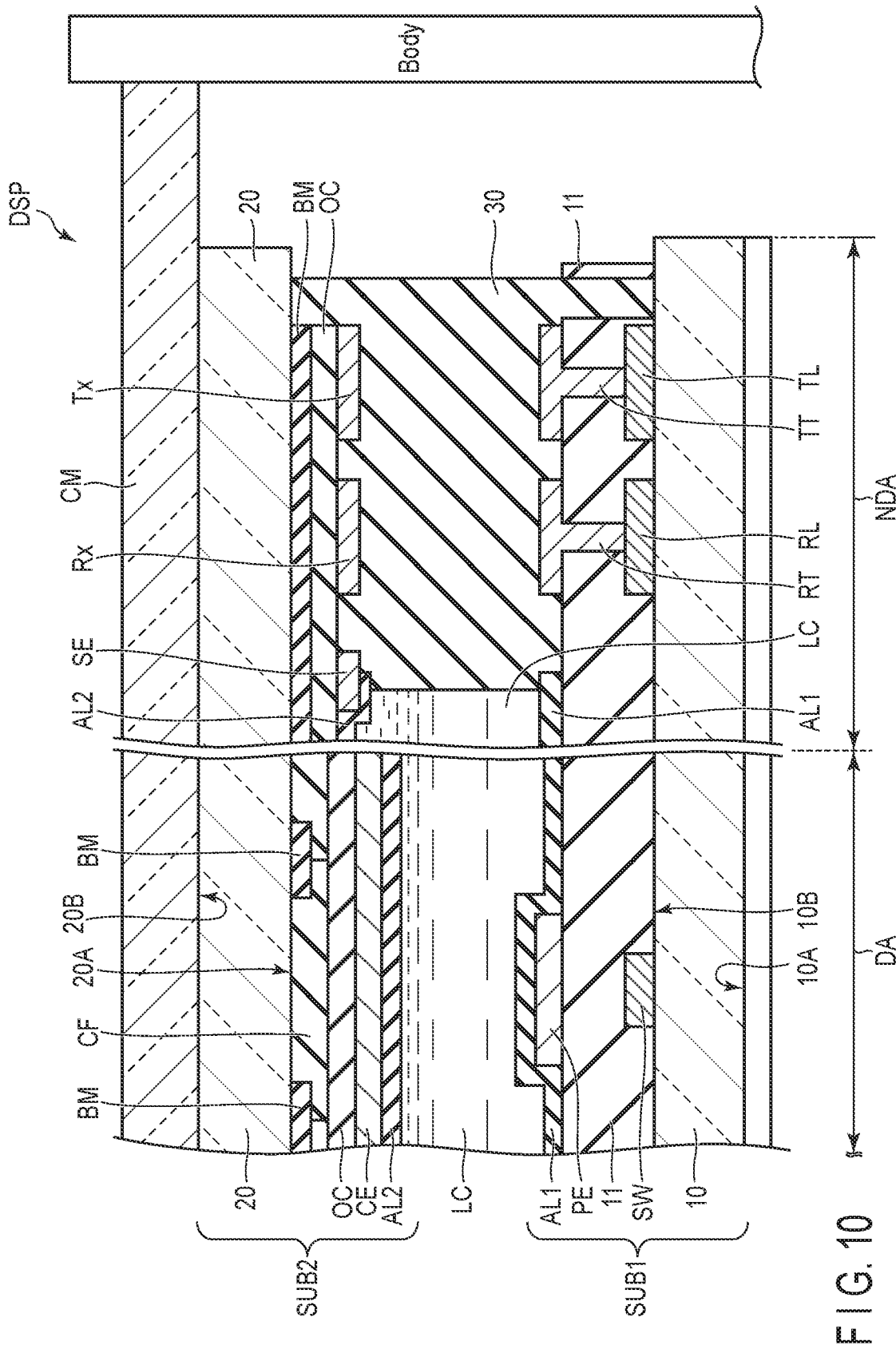
FIG. 10 is a cross-sectional view showing yet another configuration example of the display device according to the embodiments.

FIG. 10 is a cross-sectional view showing a configuration example of the display device DSP of the embodiments, which is different from that of FIG. 6. The configuration shown in FIG. 10 is different from the configuration shown in FIG. 6 in that the detection electrode Rx and the drive electrode Tx are entirely covered with the seal 30 and that a part of the shield electrode SE is covered with the seal 30.

The configuration shown in FIG. 10 has the differences that the detection electrode Rx and the drive electrode Tx are entirely covered with the seal 30 and that a part of the shield electrode SE is covered with the seal 30, but since the shield electrode SE is arranged between the detection electrode Rx and the pixel electrode PE or common electrode CE which is located closest to the boundary between the display area DA and the non-display area NDA similarly to the configuration shown in FIG. 6, the influences of the storage capacitance CS, the PE-Rx capacitance CP, the CE-Rx capacitance CC, and the liquid crystal capacitance CLC can be blocked by the shield electrode SE and the above-described occurrence of detection error can be suppressed.

In addition, in the comparative example shown in FIG. 10, too, since the detection electrode Rx is arranged substantially far from the display area DA similarly to the configuration shown in FIG. 6, the electric field formed between the drive electrode Tx and the detection electrode Rx during the touch detection period TP does not affect the liquid crystal molecules contained in the liquid crystal layer LC on the display area DA side and the above-described degradation in display quality can be suppressed.

Figure 11:
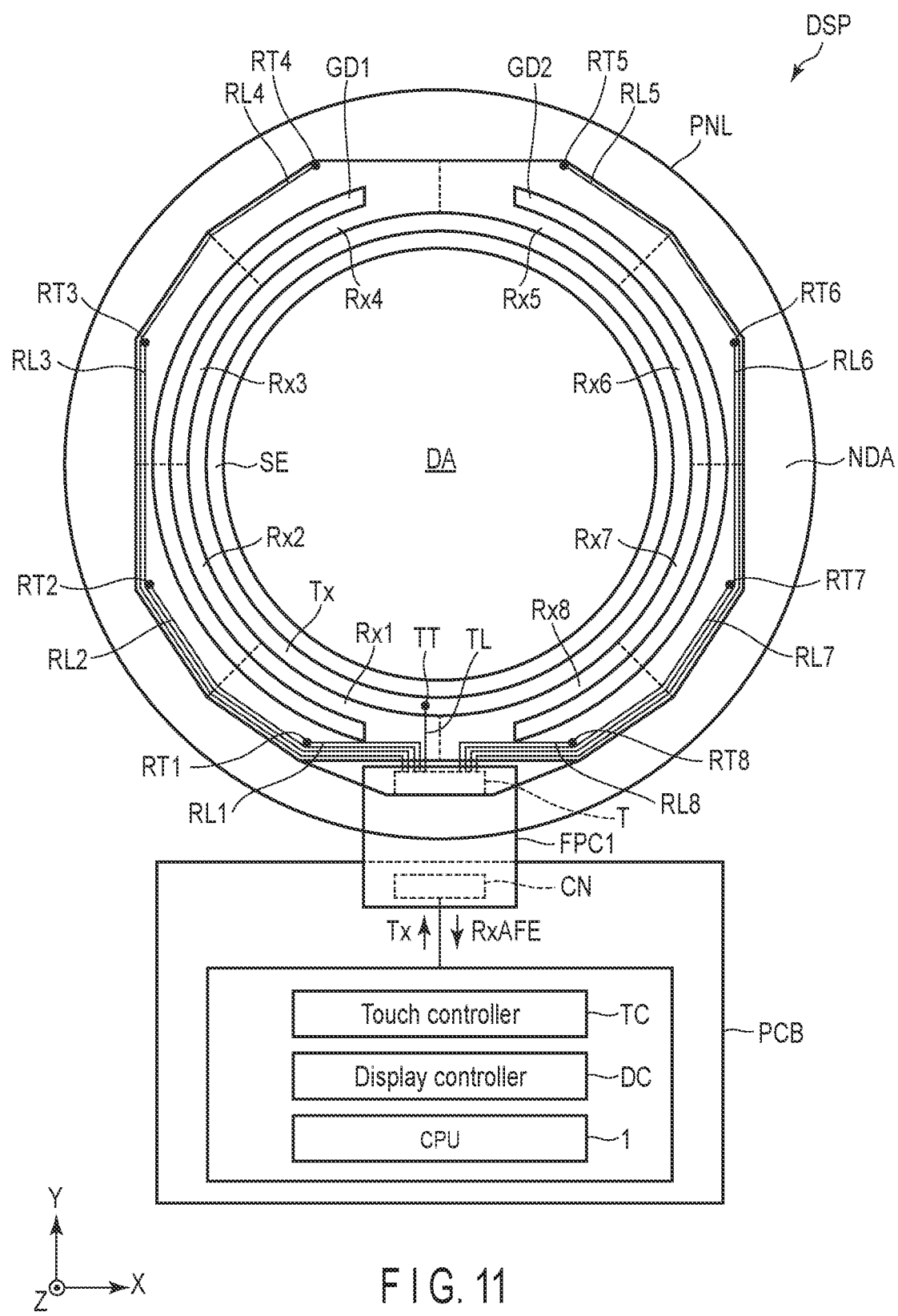
FIG. 11 is a plan view showing yet another configuration example of the display device according to the embodiments.

The configuration in which the drive electrode Tx is arranged to surround the detection electrode Rx (in other words, the drive electrode Tx is arranged on an outer side than the detection electrode Rx) has been described with reference to FIG. 6, FIG. 9, and FIG. 10, but the configuration is not limited to this, and the drive electrode Tx may be arranged on an inner side than the detection electrodes Rx as shown in, for example, FIG. 11. In other words, the detection electrodes Rx and the drive electrode Tx may be arranged to be replaced with each other. Even in this case, too, since the shield electrode SE or a space having a predetermined space width is arranged between the drive electrode Tx replacing the detection electrodes Rx and the pixel electrode PE or common electrode CE which is located closest to the boundary between the display area DA and the non-display area NDA, the same advantages as those of various configurations described above can be obtained.

In addition, the configuration in which the detection electrode Rx and the drive electrode Tx are provided has been described above, but the configuration is not limited to this and, for example, the detection electrodes Rx may be sensor electrodes, at least one of the sensor electrodes may be configured to function as the drive electrode Tx, and at least one of the sensor electrodes may be configured to function as the detection electrode Rx. In other words, the sensor electrode configured to function as the detection electrode Rx and the sensor electrode configured to function as the drive electrode Tx can be switched in time division. In this case, the constituent element corresponding to the drive electrode Tx shown in FIG. 6, FIG. 9, and FIG. 10 may be omitted. In this case, too, since the positional relationship between the detection electrode Rx and the pixel electrode PE or the common electrode CE which is located closest to the boundary between the display area DA and the non-display area NDA and the positional relationship between the liquid crystal layer LC (display area DA) and the detection electrode Rx are not changed, the same advantages as those of various configurations described above can be obtained.

Detecting the approach or contact of the object by the mutual-capacitive scheme has been described above. In the following descriptions, detecting the approach or contact of the object by the self-capacitive scheme will be described.

Figure 12:
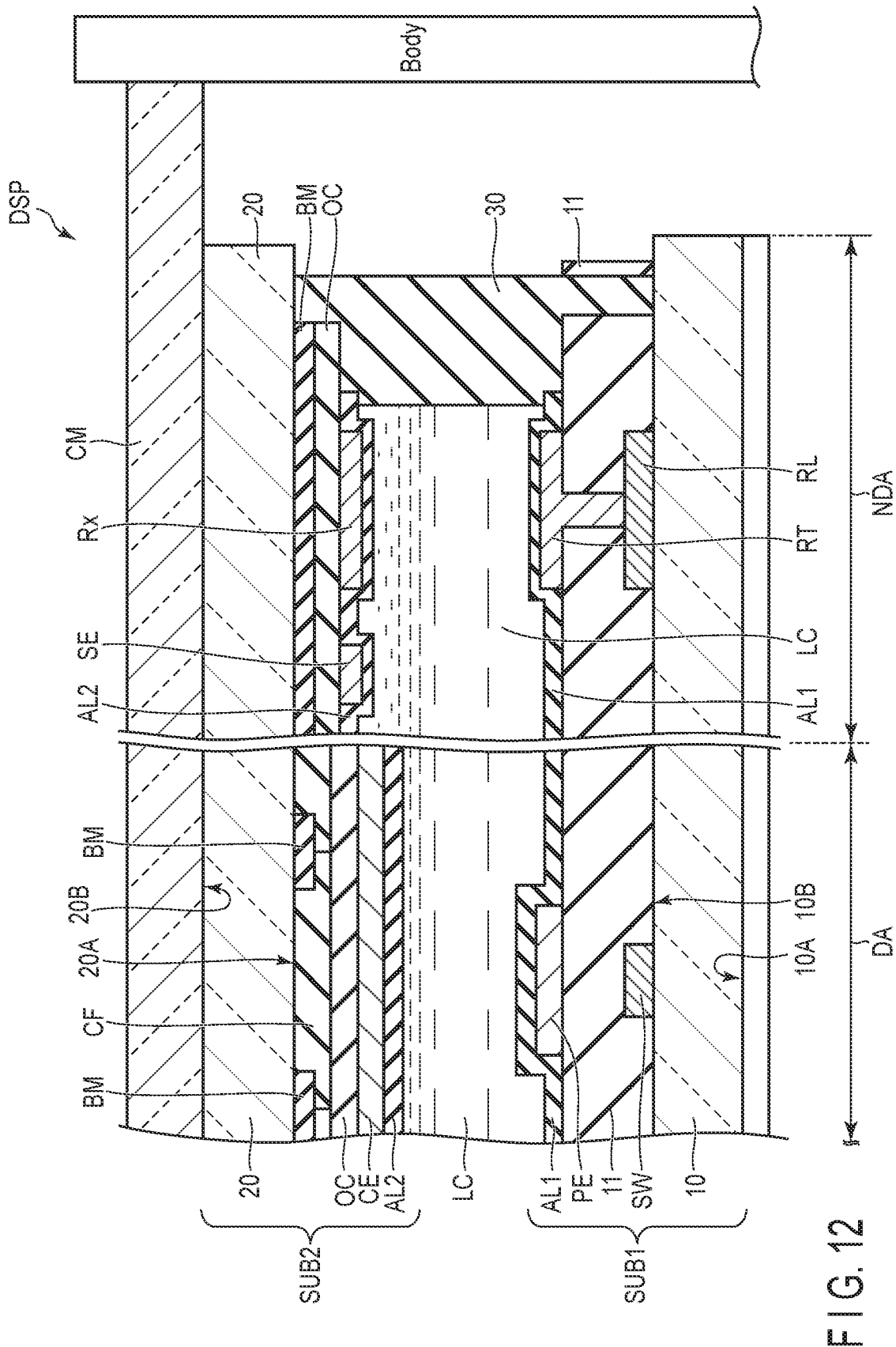
FIG. 12 is a cross-sectional view showing yet another configuration example of the display device according to the embodiments.

FIG. 12 is a cross-sectional view showing a configuration example of a display device DSP capable of detecting the approach of contact of the object by the self-capacitive scheme, unlike FIG. 6.

The configuration shown in FIG. 12 is different from the configuration shown in FIG. 6 in that the drive electrode Tx shown in FIG. 6 is omitted and the only detection electrode Rx is arranged. In the configuration shown in FIG. 12, the drive signal is input to the detection electrode Rx during the touch detection period TP.

Figure 13:
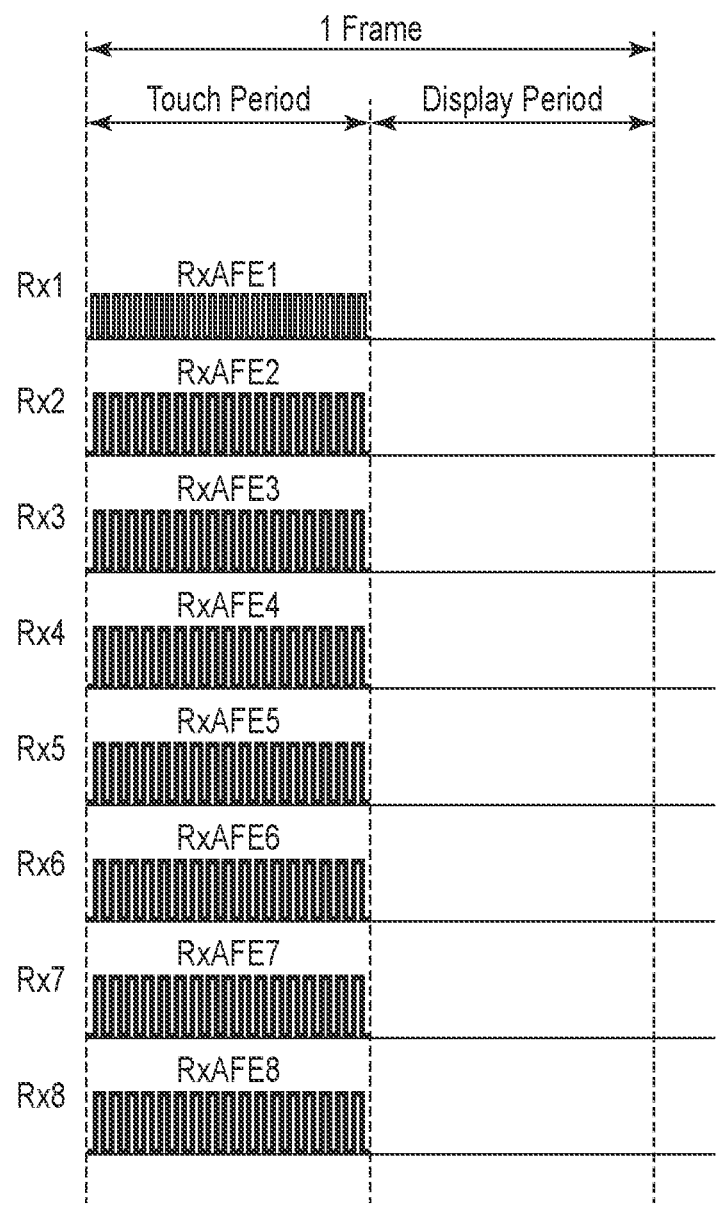
FIG. 13 is a chart showing a waveform of a detection signal read from the detection electrode using a self-capacitive scheme.

FIG. 13 is a chart showing waveforms of the detection signals RxAFE1 to RxAFE8 read from the detection electrodes Rx1 to Rx8 in the configuration shown in FIG. 12. It is assumed in FIG. 13 that a user's finger (in other words, a grounded conductor) is in touch with the detection electrode Rx1 portion arranged at the non-display area NDA. In addition, FIG. 13 shows amplitudes in a case where the detection electrodes Rx1 to Rx8 are driven with a predetermined load. In other words, since the detection electrodes are driven with a predetermined load, the larger the capacitance of the detection electrodes Rx, the smaller the driven amplitudes. The magnitude of the capacitance of the detection electrodes Rx can be detected by reading the amplitudes with the detection circuit.

As shown in FIG. 13, when the touch detection period TP in a certain frame period is started, drive signals are input (supplied) to the detection electrodes Rx1 to Rx8. The detection signals RxAFE1 to RxAFE8 of the waveforms corresponding to the input drive signals are read from the detection electrodes Rx1 to Rx8, and these detection signals RxAFE1 to RxAFE8 are output to the touch controller TC. Since it is assumed that the user's finger is in touch with the detection electrode Rx1 portion, the capacitance resulting from the electrostatic capacitive coupling generated between the detection electrode Rx1 and the user's finger is loaded on the detection electrode Rx1. For this reason, as shown in FIG. 13, the waveform of the detection signal RxAFE1 read from the detection electrode Rx1 with which the user's finger is in touch is detected with an amplitude smaller than the waveforms of the detection signals RxAFE2 to RxAFE8 read from the other detection electrodes Rx2 to Rx8. According to this, the touch controller TC detects the user's finger located on the detection electrode Rx1 corresponding to the detection signal RxAFE1 having an amplitude smaller than that of the other detection signals RxAFE2 to RxAFE8.

By obtaining the detection signals read from all the detection electrodes Rx and comparing their waveforms similarly to the above-described case of the mutual-capacitive scheme, the touch controller TC may find the detection signal having an amplitude smaller than the others and detect the user's finger on the detection electrode Rx corresponding to the detection signal having an amplitude smaller than the others (in other words, the touch controller may detect approach or contact of the object (conductor)). Alternatively, the touch controller TC may store the waveform of the detection signal read from the detection electrode Rx which is not touched, in a memory (not shown) or the like in advance, and, when the waveform of the detection signal read from the detection electrode Rx has an amplitude smaller than the waveform of the detection signal stored in the memory in advance, may detect the user's finger located on the detection electrode Rx corresponding to the detection signal. Alternatively, the touch controller TC can identify the waveform of the detection signal read from the detection electrode Rx which is not touched and the waveform of the detection signal read from the detection electrode Rx which is touched, by setting a threshold value of the detection circuit to a predetermined level. In other words, when the amplitude of the waveform of the detection signal is lower than or equal to the above-described predetermined bevel, the touch controller TC may detect the user's finger located on the detection electrode Rx corresponding to the detection signal. In addition, the touch controller TC can also detect a state in which the user's finger is in touch with an interval between two detection electrodes by setting a plurality of threshold values of the detection circuit. For example, when the user's finger is located between two detection electrodes, the amplitude of the detection signal is larger than that when the user's finger is on only one detection electrode, and is smaller than the amplitude of the detection signal output from the detection electrode Rx which is not touched. For this reason, the amplitudes of the plurality of detection waveforms can be detected and a state in which the user's finger is located between the two detection electrodes can also be detected by setting a plurality of threshold values of the detection circuit.

Thus, even in a case where approach or contact of an object is detected by the self-capacitive scheme, the shield electrode SE is arranged between the detection electrode Rx and the pixel electrode PE or common electrode CE which is located closest to the boundary between the display area DA and the non-display area NDA, as shown in FIG. 12, and the shield electrode SE can shield the detection electrode against the influences of the storage capacitance CS, the PE-Rx capacitance CP, the CE-Rx capacitance CC, and the liquid crystal capacitance CLC and can suppress occurrence of the above-described detection error. Similarly to the above-described mutual-capacitive scheme, a space having a predetermined space width may be provided between the detection electrode Rx and the pixel electrode PE or common electrode CE which is located closest to the boundary between the display area DA and the non-display area NDA, instead of the shield electrode SE.

Figure 14:
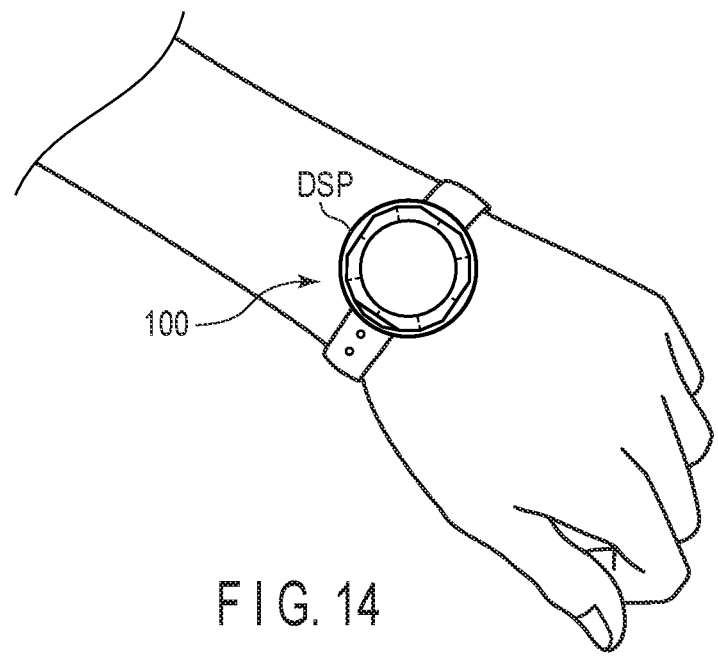
FIG. 14 is a view showing an application example of the display device according to the embodiments.

FIG. 14 shows an application example of the display device DSP according to the embodiments. As shown in FIG. 14, the display device DSP is applied to, for example, a wristwatch 100. In this case, the time and the like are displayed on the display area DA of the display device DSP, and the display area DA can detect a predetermined gesture (for example, a gesture of touching an outer peripheral part of the watch so as to make one rotation clockwise, a gesture of touching the outer peripheral part of the watch so as to make one rotation counterclockwise, a gesture of tapping or the like) by touching the detection electrode arranged at the non-display area NDA and can implement an operation corresponding to the detected predetermined gesture.

A principle of capacitive touch detection used in the embodiments will be described with reference to FIG. 15 and FIG. 16.

Figure 15:
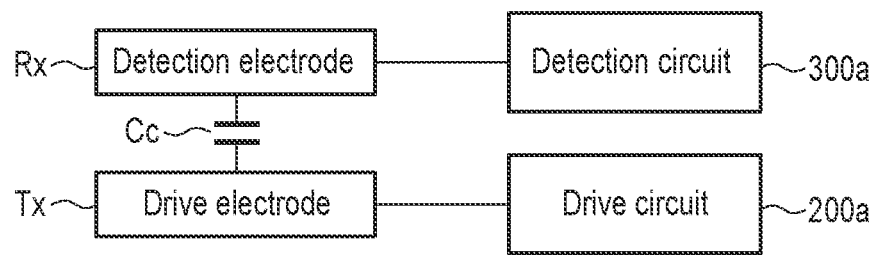
FIG. 15 is a diagram illustrating an example of a principle of touch detection using the mutual-capacitive scheme.

FIG. 15 is a diagram illustrating an example of a principle of touch detection using the mutual-capacitive scheme. The capacitance Cc exists between the drive electrode Tx and the detection electrode Rx opposed to each other. When the drive signal is supplied from a drive circuit 200a to the drive electrode Tx, a current flows to the detection electrode Rx via the capacitance Cc such that the detection signal having a predetermined waveform is read from the detection electrode Rx. In contrast, when an object (conductor such as a finger) approaches or contacts, capacitance is generated between the object and the detection electrode Rx. In this state, the drive signal is supplied to the drive electrode Tx, and the waveform of the detection signal read from the detection electrode Rx changes due to the influence of the capacitance generated between the object and the detection electrode Rx. The detection circuit 300a detects approach or contact of the object, based on the change in the waveform of this detection signal.

Figure 16:
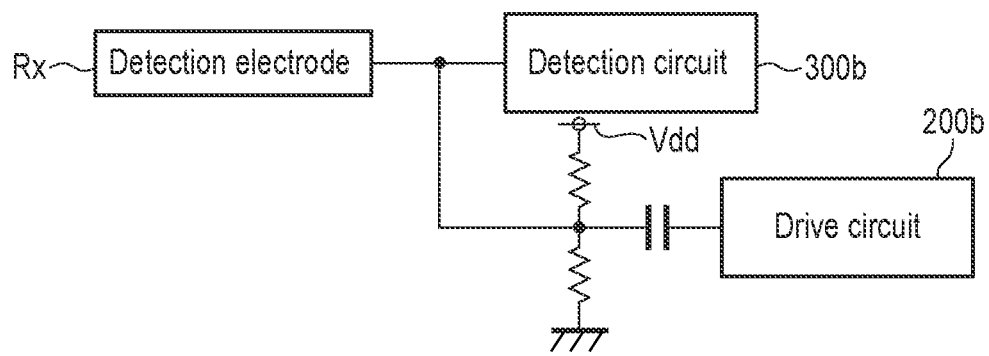
FIG. 16 is a diagram illustrating an example of a principle of touch detection using the self-capacitive scheme.

FIG. 16 is a diagram illustrating an example of a principle of touch detection using the self-capacitive scheme. A voltage obtained by dividing a voltage of a power source Vdd by resistance division is supplied to the detection electrode Rx as a bias voltage. The drive signal having a predetermined waveform is supplied from a drive circuit 200b to the detection electrode Rx by capacitive coupling or the like, and the detection signal having a predetermined waveform is read from the detection electrode Rx. At this time, when capacitance caused by a finger or the like is loaded on the detection electrode Rx, the amplitude of the detection electrode is changed. In FIG. 16, the amplitude of the detection electrode Rx decreases. Therefore, in the equivalent circuit illustrated in FIG. 16, the detection circuit 300b detects the amplitude of the detection electrode Rx to detect the presence or absence of contact or approach of an external approach object such as a finger. The self-detection circuit is not limited to the circuit illustrated in FIG. 16, and any circuit method may be adopted as long as the presence or absence of an external approach object such as a finger can be detected only by the detection electrode.

According to one of the embodiment described above, the shield electrode SE or the space having a predetermined space width is provided between the detection electrode Rx and the pixel electrode PE or common electrode CE which is located closest to the boundary between the display area DA and the non-display area NDA, in the display device DSP. According to this, in the display device DSP, since the storage capacitance CS, the PE-Rx capacitance CP, the CE-Rx capacitance CC, and the liquid crystal capacitance CLC prevent the electric field formed between the drive electrode Tx and the detection electrode Rx during the touch detection period TP from being affected during the display period DP, the operation error of the object resulting from these capacitances can be suppressed.

According to one of the above-described embodiments, a display device and a watch having both display quality upon displaying an image and excellent touch operability can be provided.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
 a display area comprising a first substrate, a second substrate opposed to the first substrate, a liquid crystal layer sealed between the first substrate and the second substrate, a pixel electrode, and a counter-electrode;
 a seal configured to seal the liquid crystal layer between the first substrate and the second substrate;
 a plurality of sensor electrodes arranged to surround the display area; and
 a shield electrode which is arranged between the plurality of sensor electrodes and the pixel electrode or the counter-electrode located closest to a boundary between the display area and a non-display area surrounding the display area, and to which a predetermined reference voltage is applied, in planar view, wherein
 the shield electrode is arranged to surround the display area,
 the plurality of sensor electrodes are arranged to surround the shield electrode, and
 at least one of the shield electrode, the detection electrode, or a drive electrode overlaps with the seal.

2. The display device of claim 1, wherein
 the pixel electrode is arranged on the first substrate, and
 the counter-electrode and the plurality of sensor electrodes are arranged on the second substrate.

3. The display device of claim 1, wherein
 the pixel electrode and the counter-electrode are arranged on the first substrate, and
 the plurality of sensor electrodes are arranged on the second substrate.

4. The display device of claim 1, further comprising:
 a drive electrode arranged to surround the plurality of sensor electrodes, wherein
 when a drive signal is input to the drive electrode, the display device detects an approaching or contacting object in a mutual-capacitive scheme, based on detection signals output from the plurality of sensor electrodes.

5. The display device of claim 1, further comprising:
 a drive electrode arranged to surround the display area, wherein
 the plurality of sensor electrodes are arranged to surround the drive electrode, and
 when a drive signal is input to the drive electrode, the display device detects an approaching or contacting object in a mutual-capacitive scheme, based on detection signals output from the plurality of sensor electrodes.

6. The display device of claim 1, wherein
 at least one of the plurality of sensor electrodes functions as a drive electrode, and at least one of the plurality of sensor electrodes functions as a detection electrode, and
 when a drive signal is input to the sensor electrode which functions as the drive electrode, the display device detects an approaching or contacting object in a mutual-capacitive scheme, based on a detection signal output from the sensor electrode which functions as the detection electrode.

7. The display device of claim 1, wherein
 the display device detects an approaching or contacting object in a self-capacitive scheme, based on detection signals output from the plurality of sensor electrodes, in accordance with drive signals input to the plurality of sensor electrodes.

8. The display device of claim 1, wherein
 a width of the shield electrode is set to any value in a range of 1 µm to 300 µm.

9. The display device of claim 8, wherein
a width of the shield electrode is set to any value in a range of 10 μm to 100 μm.

10. A watch comprising the display device of claim 1.

11. The display device of claim 1, wherein
the display device has a space with a width in a range of 10 μm to 400 μm between the plurality of sensor electrodes and the pixel electrode or the counter-electrode which is located closest to the boundary between the display area and the non-display area surrounding the display area, in planar view.

12. The display device of claim 11, wherein
the width of the space is set to any value in a range of 50 μm to 200 μm.

13. The display device of claim 11, wherein
the pixel electrode is arranged on the first substrate, and
the counter-electrode and the plurality of sensor electrodes are arranged on the second substrate.

14. The display device of claim 11, wherein
the pixel electrode and the counter-electrode are arranged on the first substrate, and
the plurality of sensor electrodes are arranged on the second substrate.

15. The display device of claim 11, wherein
the drive electrode arranged to surround the plurality of sensor electrodes, and
when a drive signal is input to the drive electrode, the display device detects an approaching or contacting object in a mutual-capacitive scheme, based on detection signals output from the plurality of sensor electrodes.

16. The display device of claim 11,
wherein
the drive electrode arranged to surround the display area,
the plurality of sensor electrodes are arranged to surround the drive electrode, and
when a drive signal is input to the drive electrode, the display device detects an approaching or contacting object in a mutual-capacitive scheme, based on detection signals output from the plurality of sensor electrodes.

17. The display device of claim 11, wherein
at least one of the plurality of sensor electrodes functions as the drive electrode, and at least one of the plurality of sensor electrodes functions as a detection electrode, and
when a drive signal is input to the sensor electrode which functions as the drive electrode, the display device detects an approaching or contacting object in a mutual-capacitive scheme, based on a detection signal output from the sensor electrode which functions as the detection electrode.

18. The display device of claim 11, wherein
the display device detects an approaching or contacting object in a self-capacitive scheme, based on detection signals output from the plurality of sensor electrodes, in accordance with drive signals input to the plurality of sensor electrodes.

19. A watch comprising the display device of claim 11.

* * * * *